Aug. 29, 1939.   W. J. METZGER   2,170,908
COUPLER SHANK AND YOKE CONNECTION
Filed Aug. 13, 1937

INVENTOR
William J. Metzger
BY
Clarence D. Kerr
ATTORNEY

Patented Aug. 29, 1939

2,170,908

UNITED STATES PATENT OFFICE 2,170,908

COUPLER SHANK AND YOKE CONNECTION

William J. Metzger, Cleveland, Ohio, assignor to National Malleable and Steel Castings Company, Cleveland, Ohio, a corporation of Ohio Application August 13, 1937, Serial No. 158,859

6 Claims. (Cl. 213—14)

This invention relates to draft rigging and more particularly to improved ball and socket connection for a car coupler shank and yoke.

In previous constructions wherein the ball and socket connection between the shank and yoke was used the ball was cast integral with the coupler shank. This arrangement proved unsatisfactory because of difficulty in molding and the occurrence of shrinkage cracks at the juncture of the ball and shank, the cracks necessitating the discard of otherwise good castings due to the defect in the ball end. In addition, accurate machining of the integral ball was both difficult and expensive. My present invention overcomes the above disadvantages in a novel manner while at the same time resulting in a new and improved construction for obtaining universal pivotal movement between the coupler shank and yoke.

An object of my invention is the provision of a separate ball on the end of the shank which may be cast of the same material as the shank, or where it is desirable to increase the wear life of the connection the ball may be made of special alloys. Another object of my invention is a coupler shank having an end of such configuration as can be easily molded without the formation of shrinkage cracks at the juncture of said end and the remainder of the shank. A further object of the invention is a coupler shank end arranged for the attachment of a separate ball for reception in a suitable socket on the yoke for obtaining pivotal movement between the shank and yoke in all directions.

My invention also contemplates a structure in which the ball and socket connection may be shimmed in various places so as to compensate for wear and at all times provide a joint free from undesirable slack or play. Other objects and advantages of my invention will be clear from the following description, taken in conjunction with the drawing, in which.

Figure 1:
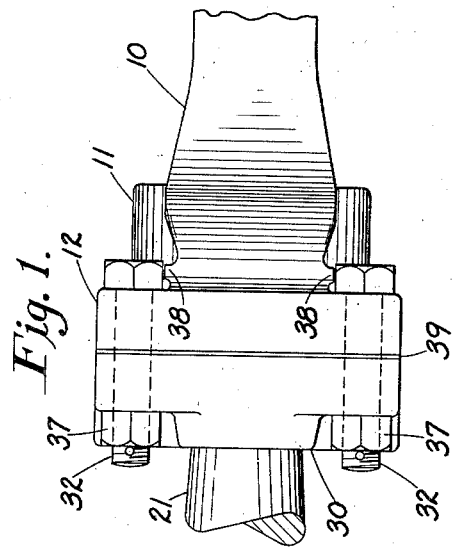
Figure 1 is a plan view of a coupler shank and yoke embodying my invention.
Figure 2:
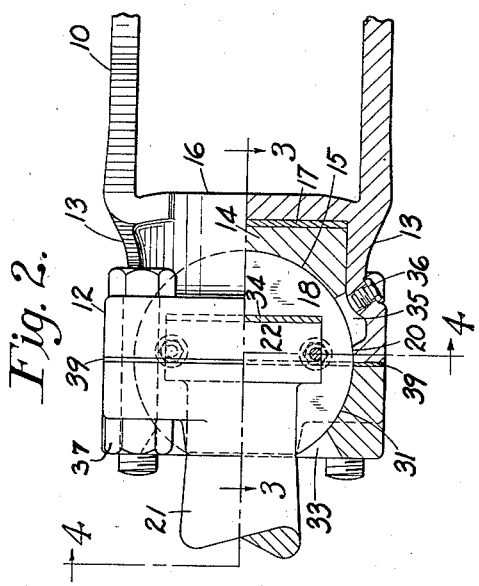
Figure 2 is a view partly in elevation and partly in vertical section of the device shown in Fig. 1.
Figure 3:
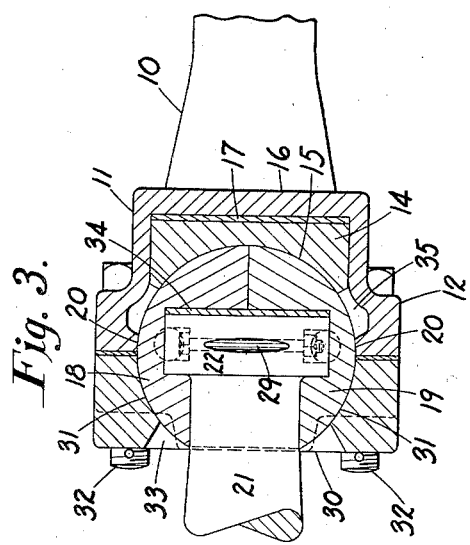
Figure 3 is a horizontal sectional view taken on line 3—3 of Fig. 2.
Figure 4:
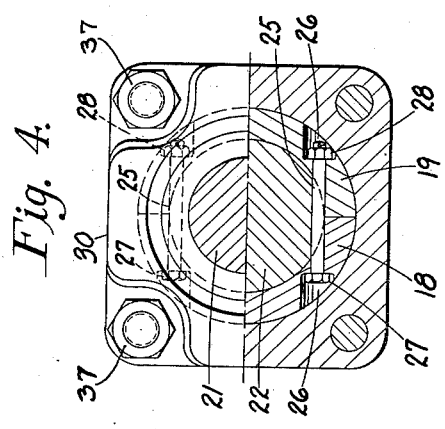
Figure 4 is an end view as seen from the front of the coupler and is shown partly in vertical section, taken on line 4—4 of Fig. 2.

Referring to the drawing, there is shown a yoke 10 having, at the forward end thereof, a housing comprising a substantially cylindrical portion 11 and a rectangular portion 12. Reinforcing the connection between the yoke and cylindrical portion 11 are the ribs 13, 13 extending across the top and bottom of the portion 11 and merging with the upper and lower arms of the yoke. Within the cylindrical portion 11 of the housing is the cylindrical block 14 having a concavely curved ball-seat 15. Interposed between the block 14 and the rear vertical wall 16 of the portion 11 is a shim 17 the thickness of which may be varied to adjust the position of block 14 when necessary as, for instance, to compensate for wear. A ball made of two sections 18 and 19 bears against the ball-seat 15 of block 14 and against the spherically curved surface 20 of the housing 12.

It will be observed that the end of shank 21 is of relatively simple configuration, it being substantially T-shape in longitudinal cross-section, with the outer surface of portion 22 and the adjacent part of the shank cylindrical in form. The end of the shank can, therefore, be finished by a simple machining operation. The two sections of the ball are recessed so as to snugly fit over the cylindrical portions 21 and 22 of the coupler shank and are held together by means of bolts 25, 25 to form a single member with shank 21. The recesses are usually machined so as to assure an accurate fit on the end of the shank. If necessary, a shim 34 may be placed between the end of the shank and the rear wall of the recess in the ball to prevent any relative longitudinal movement between the shank and ball. The ball sections are recessed, as at 26, 26, to permit the bolt heads 27 and nuts 28 to lie wholly within the surface of the ball, and to prevent relative rotative movement between the ball and shank, the latter is formed with grooves 29 which receive the center portions of bolts 25.

A substantially rectangular front housing 30 having a concavely curved ball-seat 31 encloses the forward side of the ball and is bolted to the rear housing by means of bolts 32 and nuts 37. Interposed between the two housings is the shim 39 which may be varied in thickness to assure proper fitting of the parts and to compensate for wear. Housing 30 has an opening 33 at the forward end thereof of slightly greater diameter than end 22 of the coupler shank so as to permit the housing to be slipped over the shank during assembly. In addition, opening 33 provides clearance for universal pivotal movement of the shank relative to the yoke.

In the rear housing 12 I provide a circular channel 35 about the ball to serve as a lubricant reservoir and to assure an adequate supply of lubricant to the joint. Lubricant may be added through the fitting 36 located on the underside of the housing.

It will be noted that the nuts 37 are on the coupler side of the connection so that they can be removed from the front end when the joint is to be disassembled, without having to drop the draft rigging as would be necessary if the bolts were reversed. Inspection and shimming of the parts are thus readily made. Lugs 38 are provided to prevent the bolts from turning when the nuts are being tightened.

In assembling this unit the front housing 30 is first placed over the portion 21 of the coupler shank. The two ball sections are then placed over end 22 of the shank and are bolted together with a shim 34 in place, if necessary to obtain a snug fit. The shank is next moved into the rear housing against member 14 which is adjusted to the correct position longitudinally of the shank by the insertion or removal of shim or shims 17. The front housing is then bolted to the rear housing to complete the assembly. If required, shims 39 are placed between housings 12 and 30 to obtain proper engagement between the front of the ball and surface 31 on housing 30.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. A coupler shank having an enlarged end portion, a ball member on said shank for pivotal connection to a yoke, said member comprising a plurality of sections each having a recess receiving a part of said enlarged end portion, the outer surfaces of said sections when assembled with said shank forming the surface of a sphere, and means including said recess and said enlarged end portion and within the confines of said last named surface for securing said sections together in such a manner that said ball member is immovable relative to said shank.

2. In a coupler shank and yoke connection, a coupler shank having an enlarged end, a multi-sectioned ball member fitted over said end, said member and said enlarged end being constructed and arranged to prevent movement of said ball laterally of said shank, means for securing said member to said shank, said means engaging said shank for preventing pivotal movement of said member relative to said shank, a yoke, and means on said yoke receiving said ball member for pivotally joining said shank and yoke.

3. In a coupler shank and yoke connection, a coupler shank having an enlarged end portion, a ball member comprising a plurality of sections each having a recess snugly receiving a part of said portion, means securing said sections together, said means engaging said enlarged portion for preventing pivotal movement of said ball relative to said shank, a yoke having a pocket receiving said member, a housing secured to said yoke for pivotally joining said shank and yoke, and means between said member and yoke and said housing and yoke for positioning said member and housing in a plurality of fixed longitudinal positions relative to said yoke.

4. In a coupler shank and yoke connection, a coupler shank having an enlarged end portion, a ball member comprising a plurality of sections recessed to snugly receive said enlarged end portion, means extending transversely of said shank and received in a recess in said enlarged end portion for securing the sections of said ball on said shank for preventing rotative movement between said ball and shank, a yoke having a socket, including a vertical rear wall integral with said yoke, receiving the rear portion of said ball, means in engagement with said wall having a spherical surface engaging said ball forwardly of said wall, a housing having a socket engaging the forward portion of said ball, and means for securing said housing to said yoke.

5. In a coupler shank and yoke connection, a coupler shank having an enlarged end portion, a ball member comprising a plurality of sections secured to said end portion, a yoke having a housing portion to receive at least a portion of said ball member, a filler block of unyielding material disposed inside said housing in fixed relation thereto for transmitting buffing stresses to the yoke and having a surface providing the rear portion of a socket for said ball, a housing having a surface providing the forward portion of said socket, and means for securing said housing to said yoke.

6. A coupler shank and yoke connection as defined in claim 5 in which the filler block and the yoke housing portion have substantially flat rear walls adapted to receive a flat shim therebetween.

WILLIAM J. METZGER.